US010990401B2

United States Patent
Uliel et al.

(10) Patent No.: US 10,990,401 B2
(45) Date of Patent: *Apr. 27, 2021

(54) COMPUTATION ENGINE WITH STRIDED DOT PRODUCT

(71) Applicant: Apple Inc., Cupertino, CA (US)

(72) Inventors: Tal Uliel, San Francisco, CA (US); Eric Bainville, Sunnyvale, CA (US); Jeffry E. Gonion, Campbell, CA (US); Ali Sazegari, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,631

(22) Filed: Apr. 1, 2020

(65) Prior Publication Data

US 2020/0225958 A1   Jul. 16, 2020

Related U.S. Application Data

(63) Continuation of application No. 15/946,724, filed on Apr. 5, 2018, now Pat. No. 10,642,620.

(51) Int. Cl.
*G06F 9/302* (2018.01)
*G06F 9/312* (2018.01)
(Continued)

(52) U.S. Cl.
CPC .......... *G06F 9/3836* (2013.01); *G06F 9/3802* (2013.01); *G06F 7/5443* (2013.01);
(Continued)

(58) Field of Classification Search
CPC .... G06F 9/3836; G06F 9/3802; G06F 9/3001; G06F 9/30014; G06F 9/30029;
(Continued)

(56) References Cited

U.S. PATENT DOCUMENTS

| 4,719,588 A | 1/1988 | Tatemichi et al. |
| 5,025,407 A | 6/1991 | Gulley et al. |

(Continued)

FOREIGN PATENT DOCUMENTS

| CN | 106445471 | 2/2017 |
| EP | 3051412 A1 | 8/2016 |
| WO | 2017185389 A1 | 11/2017 |

OTHER PUBLICATIONS

Shaoli Liu et al., "Cambricon," ACM Sigarch Computer Architecture News, ACM Special Interest Group on Computer Architecture, 2 Penn Plaza, Suite 701 New York, NY 10121-0701 USA, vol. 44, No. 3, Jun. 18, 2016 (Jun. 180, 2016, pp. 393-405, XP058300636, ISSN:0163-5964, DOI: 10:1145/3007787.3001179.

(Continued)

*Primary Examiner* — Daniel H Pan
(74) *Attorney, Agent, or Firm* — Kowert, Hood, Munyon, Rankin & Goetzel, P.C.; Lawrence J. Merkel

(57) ABSTRACT

In an embodiment, a computation engine may perform dot product computations on input vectors. The dot product operation may have a first operand and a second operand, and the dot product may be performed on a subset of the vector elements in the first operand and each of the vector elements in the second operand. The subset of vector elements may be separated in the first operand by a stride that skips one or more elements between each element to which the dot product operation is applied. More particularly, in an embodiment, the input operands of the dot product operation may be a first vector having second vectors as elements, and the stride may select a specified element of each second vector.

20 Claims, 5 Drawing Sheets

(51) Int. Cl.
| | |
|---|---|
| *G06F 15/76* | (2006.01) |
| *G06F 17/16* | (2006.01) |
| *G06F 7/52* | (2006.01) |
| *G06F 9/38* | (2018.01) |
| *G06F 15/80* | (2006.01) |
| *G06F 9/30* | (2018.01) |
| *G06F 7/544* | (2006.01) |

(52) U.S. Cl.
CPC ........ *G06F 9/3001* (2013.01); *G06F 9/30014* (2013.01); *G06F 9/30029* (2013.01); *G06F 9/30036* (2013.01); *G06F 9/30043* (2013.01); *G06F 15/8053* (2013.01); *G06F 17/16* (2013.01); *G06F 2212/454* (2013.01)

(58) Field of Classification Search
CPC ............. G06F 9/30036; G06F 9/30043; G06F 7/5443; G06F 15/8053; G06F 2212/454; G06F 17/16
USPC ....... 712/2–9, 214, 215, 221, 223, 225, 227; 708/501, 603, 607
See application file for complete search history.

(56) References Cited

U.S. PATENT DOCUMENTS

| | | | |
|---|---|---|---|
| 5,852,444 A | 12/1998 | Lippincott | |
| 5,903,769 A | 5/1999 | Arya | |
| 6,675,187 B1 | 1/2004 | Greenberger | |
| 6,901,422 B1 | 5/2005 | Sazegari | |
| 6,922,716 B2 | 7/2005 | Desai et al. | |
| 6,959,378 B2* | 10/2005 | Nickolls ............... | G06F 9/3001 712/226 |
| 7,337,205 B2 | 2/2008 | Sazegari | |
| 7,668,894 B2 | 2/2010 | Sazegari et al. | |
| 9,658,986 B2 | 5/2017 | Ge et al. | |
| 10,089,278 B2 | 10/2018 | Moskovich et al. | |
| 10,346,163 B2 | 7/2019 | Bainville et al. | |
| 10,642,620 B2* | 5/2020 | Uliel ..................... | G06F 9/3836 |
| 10,831,488 B1 | 11/2020 | Bainville et al. | |
| 10,877,754 B2 | 12/2020 | Bainville et al. | |
| 2003/0188127 A1 | 10/2003 | So | |
| 2003/0221086 A1* | 11/2003 | Simovich ............ | G06F 15/8061 712/4 |
| 2005/0125631 A1 | 6/2005 | Symes et al. | |
| 2005/0203980 A1 | 9/2005 | Harrison et al. | |
| 2005/0225562 A1 | 10/2005 | Higgins et al. | |
| 2009/0024685 A1 | 1/2009 | Salama et al. | |
| 2009/0030960 A1 | 1/2009 | Geraghty | |
| 2009/0077345 A1 | 3/2009 | Moyer | |
| 2009/0100247 A1 | 4/2009 | Moyer et al. | |
| 2010/0274990 A1 | 10/2010 | Wilder | |
| 2011/0153707 A1 | 6/2011 | Ginzburg et al. | |
| 2012/0254591 A1 | 10/2012 | Hughes et al. | |
| 2012/0254592 A1 | 10/2012 | San Adrian et al. | |
| 2013/0159665 A1 | 6/2013 | Kashyap | |
| 2013/0198495 A1 | 8/2013 | Vick et al. | |
| 2014/0019720 A1 | 1/2014 | Sprangle et al. | |
| 2014/0365548 A1* | 12/2014 | Mortensen ............ | G06F 9/3893 708/523 |
| 2015/0012724 A1 | 1/2015 | Lutz et al. | |
| 2016/0322059 A1 | 11/2016 | Vlietinck et al. | |
| 2017/0031682 A1 | 2/2017 | Eapen et al. | |
| 2017/0039034 A1 | 2/2017 | Satpathy et al. | |
| 2017/0097884 A1* | 4/2017 | Werner ................ | G06F 12/023 |
| 2017/0102892 A1 | 4/2017 | Pusukuri et al. | |
| 2017/0192781 A1* | 7/2017 | Valentine .............. | G06F 9/3455 |
| 2018/0032312 A1 | 2/2018 | Hansen et al. | |
| 2018/0074824 A1 | 3/2018 | Sazegari | |
| 2018/0107630 A1 | 4/2018 | Zhou et al. | |
| 2018/0137075 A1* | 5/2018 | Linderman ......... | G06F 13/4022 |
| 2018/0321937 A1 | 11/2018 | Brown et al. | |
| 2018/0357064 A1 | 12/2018 | Chen et al. | |
| 2019/0065150 A1 | 2/2019 | Heddes et al. | |
| 2019/0065190 A1 | 2/2019 | Zhang | |
| 2019/0079903 A1 | 3/2019 | Dreyer et al. | |
| 2019/0102178 A1 | 4/2019 | Zbiciak | |
| 2019/0310855 A1 | 10/2019 | Uliel et al. | |

OTHER PUBLICATIONS

Song Han et al: EIE: Efficient Interence Engine on Compressed Deep Neural Networks, ACM Sigarch Computer Architecture News, ACM Special Interset Group on Computer Archtecture, 2 Penn Plaza, Suite 701 New York NY 10121-0701 USA, Stanford University, 2016, 12 pages.

Tang et al., "Table-Lookup Algorithms for Elementary Functions and Their Error Analysis", 1991, pp. 232-236.

Kantabutra, "On Hardware for Computing Exponential and Trigonometric Functions", Mar. 1996, pp. 328-339.

ISR/WO, PCT/US2019/042744, mailed Oct. 23, 2019, 15 pages.

* cited by examiner

| Instruction | Description |
|---|---|
| LoadX Xn | Load X memory from main memory at pointer Xn |
| LoadY Xn | Load Y memory from main memory at pointer Xn |
| StoreX Xn | Store X memory to main memory at pointer Xn |
| StoreY Xn | Store Y memory to main memory at pointer Xn |
| DotProd<px><py><pz><Str> Xn, Yn | Dot product of X and strided elements of Y, Sum with Elements of Z. <px> indicates x input precision, <py> indicates y input precision, and <pz> indicates output precision (e.g. 8, 16, or 32 bit). <Str> indicates stride among vector elements |

COMPUTATION ENGINE WITH STRIDED DOT PRODUCT

This application is a continuation of U.S. patent application Ser. No. 15/946,724, filed on Apr. 5, 2018 and now U.S. Pat. No. 10,642,620. The above application is incorporated herein by reference in its entirety.

BACKGROUND

Technical Field

Embodiments described herein are related to computation engines that assist processors and, more particularly, to computation engines that include dot product functionality.

Description of the Related Art

A variety of workloads being performed in modern computing systems rely on massive numbers of computations on relatively small numbers. For example, certain long short term memory (LSTM) learning algorithms are used in a variety of contexts such as language detection, card readers, natural language processing, handwriting processing, and machine learning, among other things. LSTM processing includes numerous multiplications and accumulations. In particular, batch LSTM includes a large number of vector/matrix dot products.

General purpose processors (e.g. central processing units, or CPUs), even with vector instructions in the CPU instruction set, tend to exhibit very low performance on the above types of workloads; while the power consumption is very high. Low performance, high power workloads are problematic for any computing system, but are especially problematic for battery-powered systems such as mobile devices.

SUMMARY

In an embodiment, a computation engine may offload work from a processor (e.g. a CPU) and efficiently perform computations such as those used in LSTM and other workloads at high performance. In an embodiment, the computation engine may perform dot product computations on input vectors. The dot product operation may have a first operand and a second operand, and the dot product may be performed on a subset of the vector elements in the first operand and each of the vector elements in the second operand. The subset of vector elements may be separated in the first operand by a stride that skips one or more elements between each element to which the dot product operation is applied. More particularly, in an embodiment, the input operands of the dot product operation may be a first vector having second vectors as elements, and the stride may select a specified element of each second vector, skipping other elements of each second vector.

BRIEF DESCRIPTION OF THE DRAWINGS

The following detailed description makes reference to the accompanying drawings, which are now briefly described.

FIG. 4 is a table of instructions which may be used for one embodiment of the processor and computation engine.

Figure 1:
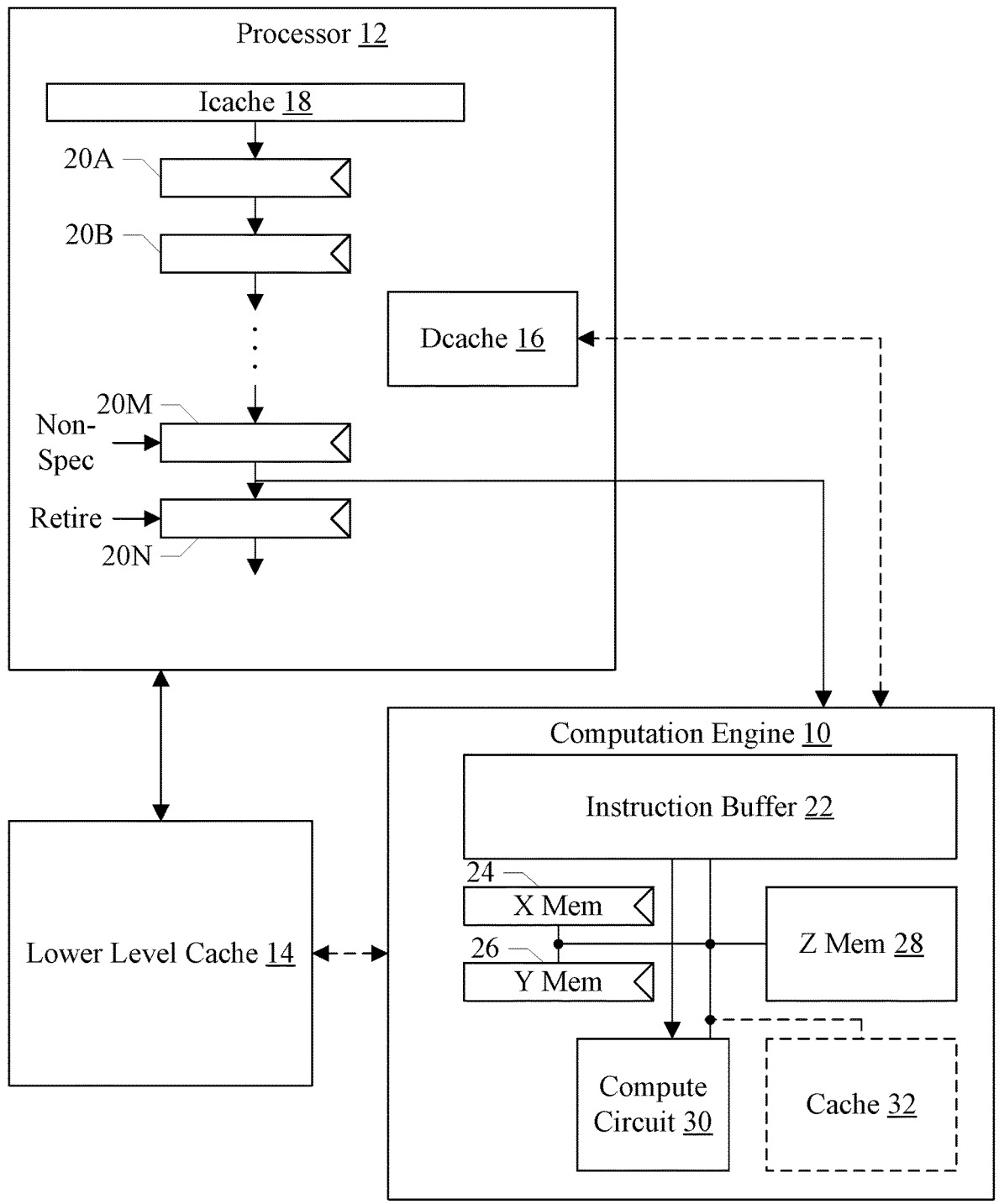
FIG. 1 is a block diagram of one embodiment of a processor, a computation engine, and a lower level cache.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Turning now to FIG. 1, a block diagram of one embodiment of an apparatus including a processor 12, a computation engine 10, and a lower level cache 14 is shown. In the illustrated embodiment, the processor 12 is coupled to the lower level cache 14 and the computation engine 10. In some embodiments, the computation engine 10 may be coupled to the lower level cache 14 as well, and/or may be coupled to a data cache (DCache) 16 in the processor 12. The processor 12 may further include an instruction cache (ICache) 18 and one or more pipeline stages 20A-20N. The pipeline stages 20A-20N may be coupled in series. The computation engine 10 may include an instruction buffer 22, an X memory 24, a Y memory 26, a Z memory 28, and a compute circuit 30 coupled to each other. In some embodiments, the computation engine 10 may include a cache 32.

The computation engine 10 may be configured to perform one or more computation operations. The computation engine 10 may employ an instruction set, which may be a subset of the instruction set implemented by the processor 12. The processor 12 may recognize instructions implemented by the computation engine 10 and may communicate the instructions to the computation engine 10.

In one embodiment, the computation operations specified by the instructions implemented in the computation engine 10 may be performed on vectors of input operands. For example, an embodiment receives vectors of operands from the X memory 24 and the Y memory 26. The compute circuit 30 may include an array of circuits to perform the operations. Each circuit in the array may receive a vector element from the X memory 24 and a vector element from the Y memory 26, and may evaluate the operation on the vector elements. In an embodiment, the result of the operation may be accumulated with the current value in a corresponding location in the Z memory 28, for write back to the corresponding location in the Z memory 28.

In an embodiment, the computation engine 10 may support various data types and data sizes (or precisions). For example, floating point and integer data types may be supported. The floating point data type may include 16 bit, 32 bit, and 64 bit precisions. The integer data types may include 8 bit and 16 bit input precisions, and both signed and unsigned integers may be supported. Output integer precisions may include 16 bit and 32 bit, in an embodiment Other embodiments may include a subset of the above precisions, additional precisions, or a subset of the above precisions and additional precisions (e.g. larger or smaller precisions).

In an embodiment, the instructions may include one or more strided dot product instructions. The strided dot product instruction may perform a dot product operation on vector elements from an X memory 24 operand and selected vector elements of a Y memory 26 operand. Particularly, the strided dot product instruction may specify a stride that indicates how many elements separate the selected vector elements. That is, the stride may be a fixed value. A first vector element from the Y memory 26 may be selected, and the next element may be separated from the first vector element by one or more elements to which the dot product operation is not applied.

The strided dot product instruction may be employed for batch LSTM evaluations, for example. In many cases, the batch LSTM evaluation may only make use of certain parts of the dot product operation, and thus the strided dot product may provide an appropriate amount of computation and may not perform unnecessary computations (e.g. computations that will not subsequently be used). For example, the Y memory vector may be a first vector that includes second vectors. That is, the vector elements of the first vector may be second vectors, and the second vectors may themselves have vector elements. The strided dot product instruction may be used to select the same vector element from each of the second vectors on which to perform the dot product operation, for example. On the other hand, the strided dot product operation may be performed on each vector element in the X memory 24, in an embodiment. In another embodiment, the strided dot product instruction may be programmable to select which of the X memory 24 and Y memory 26 is strided, or multiple instructions may be supported to permit one or the other operand to be strided. Yet another embodiment may be supported which strides both the X memory 24 operand and the Y memory 26 operand.

In an embodiment, the instructions executed by the computation engine 10 may also include memory instructions (e.g. load/store instructions). The load instructions may transfer vectors from a system memory (not shown) to the X memory 24, Y Memory 26, or Z memory 28. The store instructions may write the vectors from the X and Y memories 24 and 26 to system memory. The Z memory 28 may be written to memory using an extract instruction to move the results to the X memory 24 and/or the Y memory 26, and then storing the results from the X memory 24 and/or the Y memory 26 to system memory. In another embodiment, the Z memory 28 may be stored directly to memory using a Z memory store instruction. The system memory may be a memory accessed at a bottom of the cache hierarchy that includes the caches 14, 16, and 18. The system memory may be formed from a random access memory (RAM) such as various types of dynamic RAM (DRAM) or static RAM (SRAM). A memory controller may be included to interface to the system memory. In an embodiment, the computation engine 10 may be cache coherent with the processor 12. In an embodiment, the computation engine 10 may have access to the data cache 16 to read/write data. Alternatively, the computation engine 10 may have access to the lower level cache 14 instead, and the lower level cache 14 may ensure cache coherency with the data cache 16. In yet another alternative, the computation engine 10 may have access to the memory system, and a coherence point in the memory system may ensure the coherency of the accesses. In yet another alternative, the computation engine 10 may have access to the caches 14 and 16.

In some embodiments, the computation engine 10 may include a cache 32 to store data recently accessed by the computation engine 10. The choice of whether or not to include cache 32 may be based on the effective latency experienced by the computation engine 10 and the desired level of performance for the computation engine 10. The cache 32 may have any capacity, cache line size, and configuration (e.g. set associative, direct mapped, etc.).

In the illustrated embodiment, the processor 12 is responsible for fetching the computation instructions and the memory instructions and transmitting the instructions to the computation engine 10 for execution. The overhead of the "front end" of the processor 12 fetching, decoding, etc. the instructions may be amortized over the computations performed by the computation engine 10. In one embodiment, the processor 12 may be configured to propagate the instructions down the pipeline (illustrated generally in FIG. 1 as stages 20A-20N) to the point at which the instruction becomes non-speculative. In FIG. 1, the stage 20M illustrates the non-speculative stage of the pipeline. From the non-speculative stage, the instruction may be transmitted to the computation engine 10. The processor 12 may then retire the instruction (stage 20N). Particularly, the processor 12 may retire the instruction prior to the computation engine 10 completing the computation (or even prior to starting the computation, if the computation instruction is queued behind other instructions in the instruction buffer 22).

Generally, an instruction may be non-speculative if it is known that the instruction is going to complete execution without exception/interrupt. Thus, an instruction may be non-speculative once prior instructions (in program order) have been processed to the point that the prior instructions are known to not cause exceptions/speculative flushes in the processor 12 and the instruction itself is also known not to cause an exception/speculative flush. Some instructions may be known not to cause exceptions based on the instruction set architecture implemented by the processor 12 and may also not cause speculative flushes. Once the other prior instructions have been determined to be exception-free and flush-free, such instructions are also exception-free and flush-free.

In the case of memory instructions that are to be transmitted to the computation engine 10, the processing in the processor 12 may include translating the virtual address of the memory operation to a physical address (including performing any protection checks and ensuring that the memory instruction has a valid translation).

FIG. 1 illustrates a communication path between the processor 12 (specifically the non-speculative stage 20M) and the computation engine 10. The path may be a dedicated communication path, for example if the computation engine 10 is physically located near the processor 12. The communication path may be shared with other communications, for example a packet-based communication system could be used to transmit memory requests to the system memory and instructions to the computation engine 10. The communication path could also be through system memory, for example the computation engine may have a pointer to a memory region into which the processor 12 may write computation instructions. The computation engine 10 may read the instructions from the memory region. In yet another alternative, the processor 12 may be configured to provide the program counter (PC) address from which to fetch the instruction to the computation engine 10.

The instruction buffer 22 may be provided to allow the computation engine 10 to queue instructions while other instructions are being performed. In an embodiment, the instruction buffer 22 may be a first in, first out buffer (FIFO). That is, instructions may be processed in program order. Other embodiments may implement other types of buffers.

The X memory 24 and the Y memory 26 may each be configured to store at least one vector of input operands. Similarly, the Z memory 28 may be configured to store at least one computation result. The result may be an array of results at the result size (e.g. 16 bit elements or 32 bit elements). In some embodiments, the X memory 24 and the Y memory 26 may be configured to store multiple vectors and/or the Z memory 28 may be configured to store multiple result vectors. Each vector may be stored in a different bank in the memories, and operands for a given instruction may be identified by bank number.

The processor 12 fetches instructions from the instruction cache (ICache) 18 and processes the instructions through the various pipeline stages 20A-20N. The pipeline is generalized, and may include any level of complexity and performance enhancing features in various embodiments. For example, the processor 12 may be superscalar and one or more pipeline stages may be configured to process multiple instructions at once. The pipeline may vary in length for different types of instructions (e.g. ALU instructions may have schedule, execute, and writeback stages while memory instructions may have schedule, address generation, translation/cache access, data forwarding, and miss processing stages). Stages may include branch prediction, register renaming, prefetching, etc.

Generally, there may be a point in the processing of each instruction at which the instruction becomes non-speculative. The pipeline stage 20M may represent this stage for computation instructions, which are transmitted from the non-speculative stage to the computation engine 10. The retirement stage 20N may represent the state at which a given instruction's results are committed to architectural state and can no longer by "undone" by flushing the instruction or reissuing the instruction. The instruction itself exits the processor at the retirement stage, in terms of the presently-executing instructions (e.g. the instruction may still be stored in the instruction cache). Thus, in the illustrated embodiment, retirement of compute engine instructions occurs when the instruction has been successfully transmitted to the computation engine 10.

The instruction cache 18 and data cache (DCache) 16 may each be a cache having any desired capacity, cache line size, and configuration. Similarly, the lower level cache 14 may be any capacity, cache line size, and configuration. The lower level cache 14 may be any level in the cache hierarchy (e.g. the last level cache (LLC) for the processor 12, or any intermediate cache level).

Figure 2:
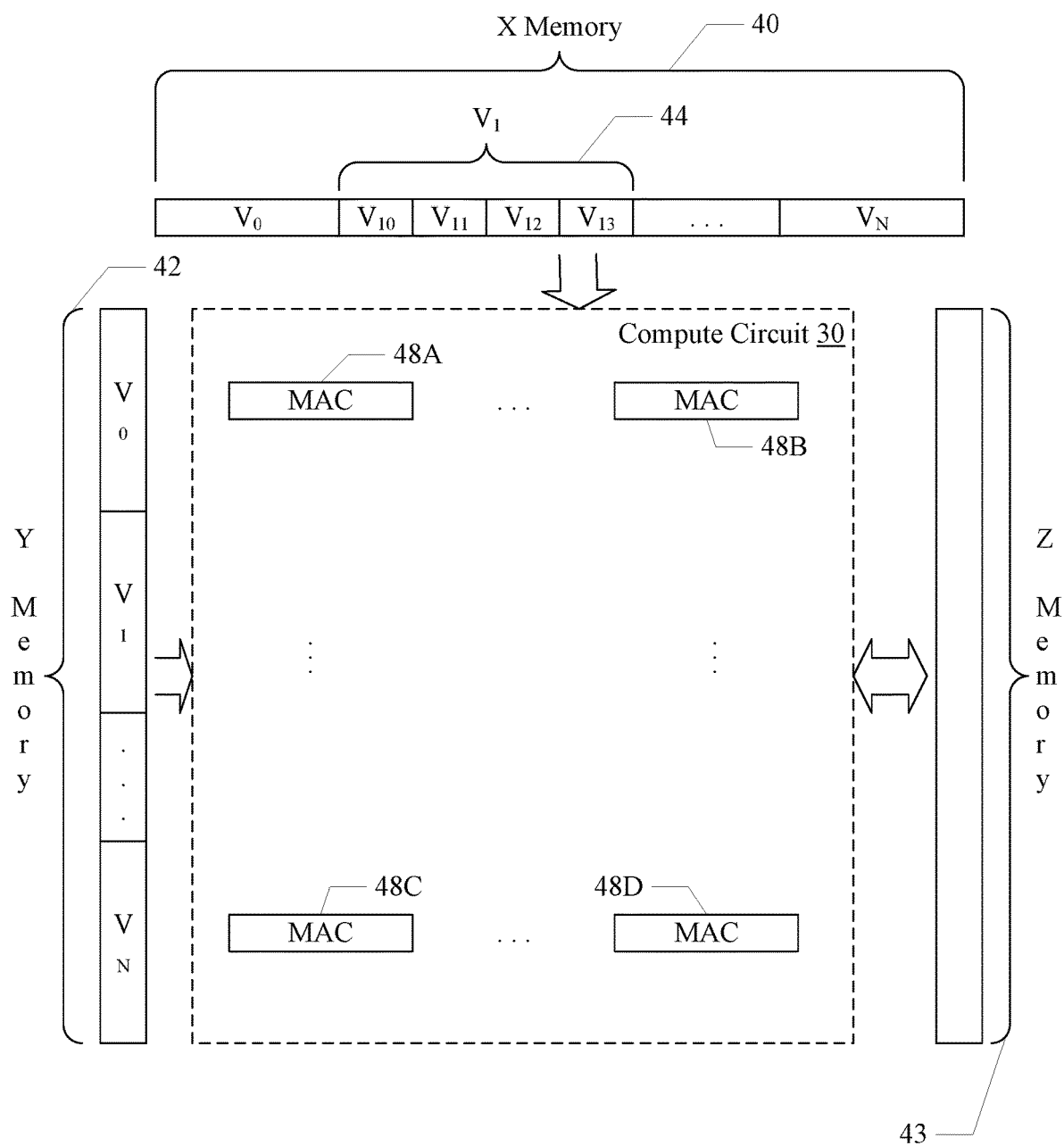
FIG. 2 is a block diagram illustrating one embodiment of the computation engine in greater detail.

Turning now to FIG. 2, a block diagram illustrating an entry of the X memory 24 (brace 40), an entry of the Y memory 26 (brace 42), the compute circuit 30, and an entry of the Z memory 28 (brace 43) is shown. Each of the X memory entry 40 and the Y memory entry 42 may include a vector of input vectors (labeled $V_0$ to $V_N$ in the FIG. 2). Vector $V_1$ of the X memory entry 40 is shown in exploded view (brace 44) to include vector elements $V_{10}$, $V_{11}$, $V_{12}$, and $V_{13}$.

The compute circuit 30 includes multiple multiply-accumulate circuits (MACs), such as MACs 48A-48D shown in FIG. 2 and additional MACs as illustrated by the ellipses in FIG. 2. Each of the MACs 48A-48D may receive a vector element from the X memory entry 40 and a vector element from the Y memory entry 42 to generate a dot product output element for the Z memory 28. The MACs may also receive the current values of the corresponding elements from the Z memory 28 to perform the accumulation operation.

More particularly, there may be a MAC circuit 48A-48D for each possible vector element in the X memory entry 40 and for each possible vector element in the Y memory entry 42 that may specified by the strided dot product instruction. For example, multiple vector element precisions may be supported, and the number of MAC circuits 48A-48D may depend on the smallest/lowest supported precision, the size of the X memory entry 40, the size of the Y memory entry 42, and the shortest stride supported by the strided dot product instruction. That is, the size of an entry divided by the smallest/lowest precision may be the maximum number of vector elements in the entry. In an embodiment, a lookup table may be used to map even smaller vector elements to larger vector elements. In such a case, the number of vector elements may be based on the minimum vector element that is not translated through the lookup table. If the maximum number of vector elements at the smallest precision in the X memory entry 40 is M, the maximum number of vector elements in the Y memory entry 42 is P, and the shortest stride is L, the number of MAC circuits 48A-48D may be (M×P)/L. In another embodiment, fewer total MAC circuits 48A-48D may be supported and multiple passes through the compute circuit 30 may be used to complete the strided dot product instruction.

In an embodiment, the stride may be selected such that the initial element of each vector in the Y memory entry 42 (e.g. the initial element of each of $V_0$, $V_1$, to $V_N$ in FIG. 2) is selected for the dot product operation. In another embodiment, an element number or offset with the vectors may be specified by the dot product instruction. The element number or offset may be used to select the initial element of the dot product instruction. The next element may be separated from the initial element by the stride, etc.

Figure 3:
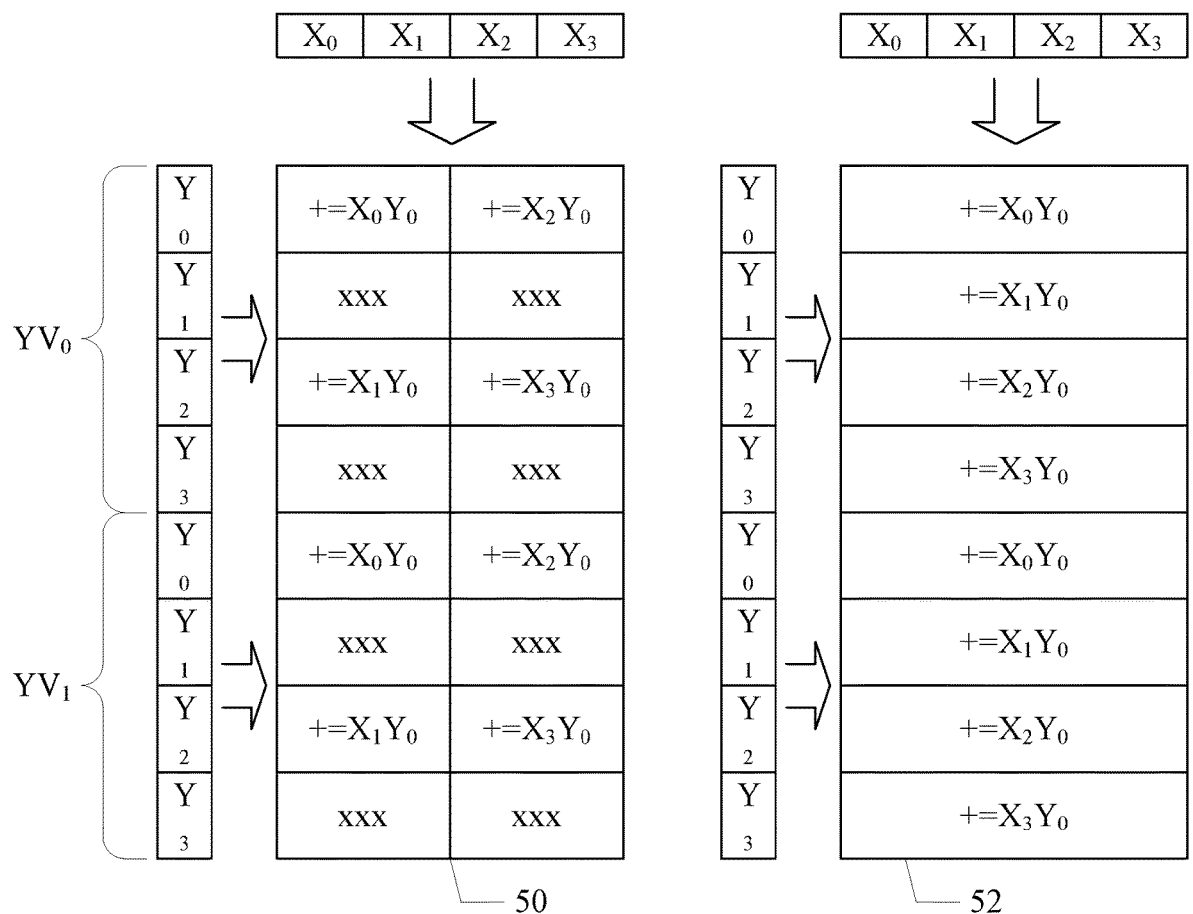
FIG. 3 is a block diagram of one embodiment of input vectors and results for two examples of a strided dot product.

FIG. 3 is an example of input vector elements from a portion of the X memory entry 40, a portion of the Y memory entry 42, and results in a portion of the Z memory entry 43. In particular, one vector from the X memory entry 40 and two vectors from the Y memory entry 42 are shown. In the example, the vectors have four vector elements each. The X vector includes elements $X_0$, $X_1$, $X_2$, and $X_3$. The Y vectors are labeled $YV_0$ and $YV_1$, and have vectors elements $Y_0$, $Y_1$, $Y_2$, and $Y_3$.

In the example on the left (reference numeral 50), the Z memory accumulates results at twice the precision of the input vectors, while in the example on the right (reference numeral 52), the Z memory accumulates results at 4 times the precision of the input vectors. The Z memory is half filled with results at reference numeral 50, and completely filled with results at reference numeral 52. In each case, element $Y_0$ of each of the input vectors $YV_0$ and $YV_1$ are multiplied by the elements of the X input vector, and summed with previous results from the Z memory. Therefore, the stride in both examples is 4. In an embodiment, the stride may be selected based on the ratio of the largest result accumulation precision and the smallest input precision (after table mappings, if any). The stride may be multiplied by the input precision to determine the number of bits/bytes to skip in the Y memory entry, or may be measured in multiples of the precision size, in various embodiments.

FIG. 4 is a table 90 illustrating an exemplary instruction set for one embodiment of the computation engine 10. Other embodiments may implement any set of instructions, including subsets of the illustrated set, other instructions, a combination of subsets and other instructions, etc.

The memory operations for the computation engine 10 may include load and store instructions. Specifically, in the illustrated embodiment, there are load and store instructions for the X and Y memories, respectively. In an embodiment, the X and Y memories may have multiple banks for storing different vectors. In such an embodiment, there may be multiple instructions to read/write the different banks or there may be an operand specifying the bank affected by the load/store X/Y instructions. In each case, an X memory bank may store a pointer to memory from/to which the load/store is performed. The pointer may be virtual and may be translated by the processor 12 as discussed above. Alternatively, the pointer may be physical and may be provided by the processor 12 post-translation.

In the case of the Z memory 28, an extract instruction may be used to write Z memory results to the X memory 24 (or Y memory 26). In some embodiments, the data may be downsized and/or deinterleaved when being extracted. The data may then be written to memory from the X memory 24 (or Y memory 26). Alternatively, an explicit Z memory store instruction may be provided.

The strided dot product instruction (DotProd) may perform a dot product on the vector elements in the X memory entry Xn and the selected vector elements of the Y memory entry Yn. The selected vector elements are separated by the stride amount. The input precisions for X and Y may be <px> and <py>, respectively, and the output precision may be <pz>. The stride amount may be specified by the stride field <Str>. Alternatively, the stride may be implicit in the input and output precisions, or may be a fixed amount based on the ratio of the maximum output precision and the minimum input precision. In this example, 8, 16, and 32 bit precisions are supported and the fixed amount would be 4 vector elements.

Figure 5:
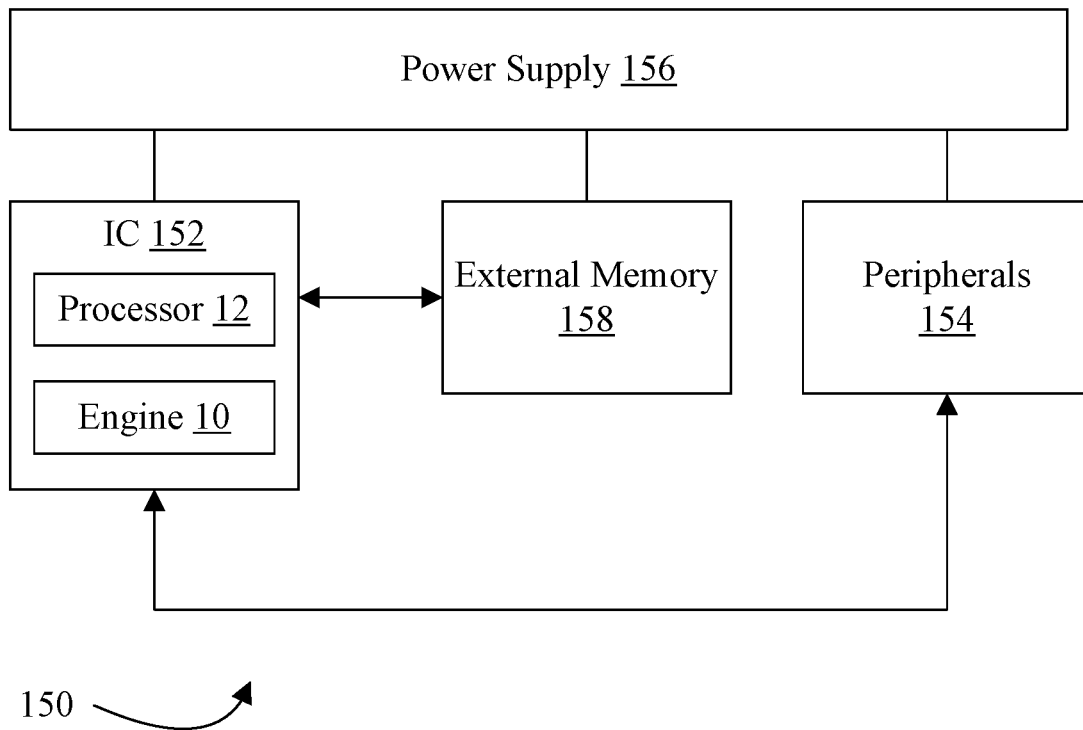
FIG. 5 is a block diagram of one embodiment of a system.

FIG. 5 is a block diagram of one embodiment of a system 150. In the illustrated embodiment, the system 150 includes at least one instance of an integrated circuit (IC) 152 coupled to one or more peripherals 154 and an external memory 158. A power supply 156 is provided which supplies the supply voltages to the IC 152 as well as one or more supply voltages to the memory 158 and/or the peripherals 154. The IC 152 may include one or more instances of the processor 12 and one or more instances of the computation engine 10. In other embodiments, multiple ICs may be provided with instances of the processor 12 and/or the computation engine 10 on them.

The peripherals 154 may include any desired circuitry, depending on the type of system 150. For example, in one embodiment, the system 150 may be a computing device (e.g., personal computer, laptop computer, etc.), a mobile device (e.g., personal digital assistant (PDA), smart phone, tablet, etc.), or an application specific computing device capable of benefitting from the computation engine 10 (e.g., neural networks, LSTM networks, other machine learning engines including devices that implement machine learning, etc.). In various embodiments of the system 150, the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the IC 152 in a chip-on-chip or package-on-package implementation.

Figure 6:
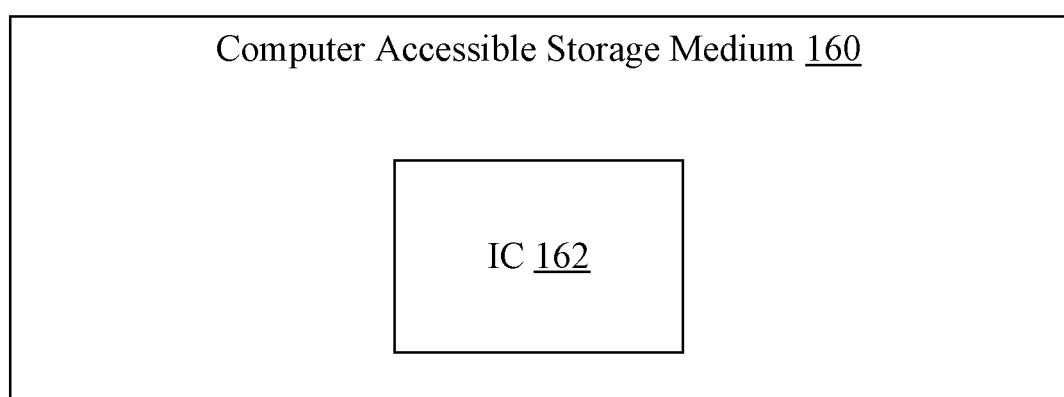
FIG. 6 is a block diagram of one embodiment of a computer accessible storage medium.

FIG. 6 is a block diagram of one embodiment of a computer accessible storage medium 160 storing an electronic description of the IC 152 (reference numeral 162) is shown. More particularly, the description may include at least the computation engine 10 and/or the processor 12. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 160 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 162 of the IC 152 stored on the computer accessible storage medium 160 may be a database which can be read by a program and used, directly or indirectly, to fabricate the hardware comprising the IC 152. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 152. The netlist may then be placed and routed to produce a data set describing geometric shapes to be applied to masks. The masks may then be used in various semiconductor fabrication steps to produce a semiconductor circuit or circuits corresponding to the IC 152. Alternatively, the description 162 on the computer accessible storage medium 300 may be the netlist (with or without the synthesis library) or the data set, as desired.

While the computer accessible storage medium 160 stores a description 162 of the IC 152, other embodiments may store a description 162 of any portion of the IC 152, as desired (e.g. the computation engine 10 and/or the processor 12, as mentioned above).

Numerous variations and modifications will become apparent to those skilled in the art once the above disclosure is fully appreciated. It is intended that the following claims be interpreted to embrace all such variations and modifications.

What is claimed is:

1. A circuit comprising:
a first input memory storing a first plurality of input vectors, during use;
a second input memory storing a second plurality of input vectors, during use; and
a compute circuit coupled to the first input memory and the second input memory, wherein the compute circuit is configured, responsive to a first instruction, to multiply selected vector elements of the first plurality of input vectors by the second plurality of input vectors, wherein the selected vector elements are separated in the first plurality of input vectors by a stride associated with the first instruction, and wherein the compute circuit comprises a plurality of multiply accumulate (MAC) circuits, and each of the plurality of MAC circuits is configured to perform one of the multiplications of one of the selected vector elements and a respective vector element of one of the second plurality of input vectors, and wherein a number of the plurality of MAC circuits is equal to a number of the selected vector elements of the first plurality of input vectors multiplied by a number of vector elements of the second plurality of input vectors and divided by the stride, and wherein the plurality of MAC circuits are configured to perform the multiplications of the selected vector elements of the first plurality of input vectors and the second plurality of input vectors.

2. The circuit as recited in claim 1 further comprising an output memory storing, during use, a plurality of results corresponding to the first instruction, and wherein the plurality of MAC circuits are configured to sum a current value of a respective one of the plurality of results with a respective multiplication result and write the sum to the output memory.

3. The circuit as recited in claim 2 wherein the stride is based on a first precision of the plurality of results and a second precision of vector elements of the first plurality of input vectors.

4. The circuit as recited in claim 3 wherein the stride is determined from the first precision and the second precision, and wherein the first precision and the second precision are explicitly specified in the first instruction.

5. The circuit as recited in claim 3 wherein the stride is based on a ratio of a maximum value of the first precision and a minimum value of the second precision.

6. The circuit as recited in claim 1 wherein the stride is explicitly specified in the first instruction.

7. The circuit as recited in claim 1 wherein the stride causes a selection of an initial element of each of the second plurality of input vectors.

8. A circuit comprising:
a first input memory storing a first plurality of input vectors, during use;
a second input memory storing a second plurality of input vectors, during use; and
a compute circuit coupled to the first input memory and the second input memory, wherein the compute circuit is configured, responsive to a first instruction, to multiply selected vector elements of the first plurality of input vectors by the second plurality of input vectors, wherein the selected vector elements are separated in the first plurality of input vectors by a stride associated with the first instruction, and wherein the compute circuit comprises a plurality of multiply accumulate (MAC) circuits, and each of the plurality of MAC circuits is configured to perform one of the multiplications of one of the selected vector elements and a respective vector element of one of the second plurality of input vectors, and wherein a number of the plurality of MAC circuits is less than a number of the selected vector elements of the first plurality of input vectors multiplied by a number of vector elements of the second plurality of input vectors and divided by the stride, and wherein the first instruction is completed using multiple iterations in the compute circuit.

9. The circuit as recited in claim 8 further comprising an output memory storing, during use, a plurality of results corresponding to the first instruction, and wherein the plurality of MAC circuits are configured to sum a current value of a respective one of the plurality of results with a respective multiplication result and write the sum to the output memory.

10. The circuit as recited in claim 9 wherein the stride is based on a first precision of the plurality of results and a second precision of vector elements of the first plurality of input vectors.

11. The circuit as recited in claim 10 wherein the stride is determined from the first precision and the second precision, and wherein the first precision and the second precision are explicitly specified in the first instruction.

12. The circuit as recited in claim 10 wherein the stride is based on a ratio of a maximum value of the first precision and a minimum value of the second precision.

13. The circuit as recited in claim 8 wherein the stride is explicitly specified in the first instruction.

14. The circuit as recited in claim 8 wherein the stride causes a selection of an initial element of each of the second plurality of input vectors.

15. A system comprising:
a computation engine; and
a processor coupled to the computation engine and configured to issue a first instruction to the computation engine;
wherein the computation engine comprises:
a first memory storing, during use, a first plurality of input vectors that include first vector elements, and
a second memory storing, during use, a second plurality of input vectors that include second vector elements; and
the computation engine further comprises a plurality of multiply accumulate (MAC) circuits, wherein the plurality of MAC circuits are configured to multiply selected first vector elements by second vector elements in response to the first instruction, and wherein the selected first vector elements are identified using a stride corresponding to the first instruction, wherein a number of the plurality of MAC circuits is less than a number of the selected first vector elements of the first plurality of input vectors multiplied by a number of vector elements of the second plurality of input vectors and divided by the stride, and wherein the first instruction is completed using multiple iterations in the plurality of MAC circuits.

16. The system as recited in claim 15 further comprising an output memory storing, during use, a plurality of results corresponding to the first instruction, and wherein the plurality of MAC circuits are configured to sum a current value of a respective one of the plurality of results with a respective multiplication result and write the sum to the output memory, and wherein the stride is based on a first precision of the plurality of results and a second precision of vector elements of the first plurality of input vectors.

17. The system as recited in claim 16 wherein the stride is determined from the first precision and the second precision, and wherein the first precision and the second precision are explicitly specified in the first instruction.

18. The system as recited in claim 16 wherein the stride is based on a ratio of a maximum value of the first precision and a minimum value of the second precision.

19. The system as recited in claim 15 wherein the stride is explicitly specified in the first instruction.

20. The system as recited in claim 15 wherein the stride causes a selection of an initial element of each of the second plurality of input vectors.

* * * * *